Figure 1:
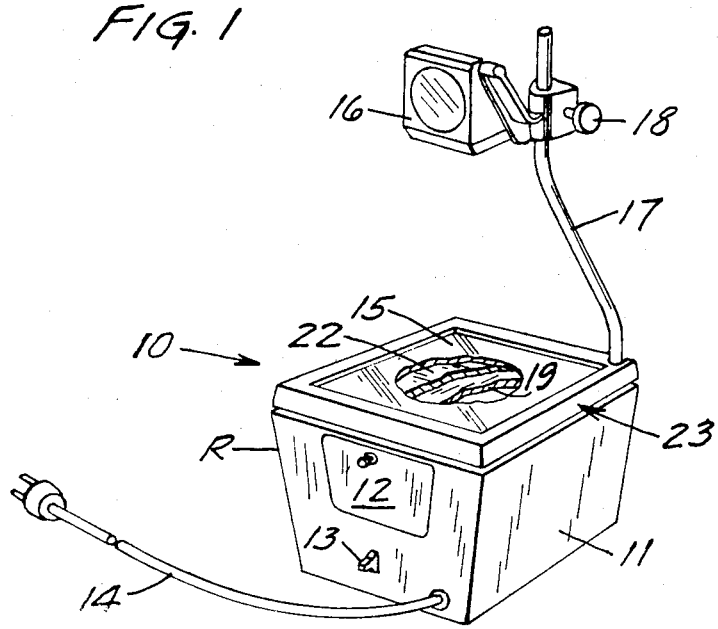

United States Patent [19]

Appledorn

[11] 3,712,713
[45] Jan. 23, 1973

[54] OPTICAL SHIELD OF TRANSPARANT INTERMESHED GROOVED PANELS USEFUL ON OVERHEAD PROJECTS

[75] Inventor: Roger H. Appledorn, White Bear Lake, Minn.

[73] Assignee: Minnesota Mining and Manufacturing Company, St. Paul, Minn.

[22] Filed: Aug. 10, 1970

[21] Appl. No.: 62,356

Related U.S. Application Data

[63] Continuation-in-part of Ser. No. 712,262, March 11, 1968, abandoned.

[52] U.S. Cl.................350/276 R, 350/167, 353/38, 353/98, 353/102
[51] Int. Cl.............................................G02b 27/00
[58] Field of Search.......350/276 R, 167; 353/38, 98, 353/102

[56] References Cited

UNITED STATES PATENTS

| | | | |
|---|---|---|---|
| 3,511,563 | 5/1970 | Erwin | 350/276 R UX |
| 3,126,786 | 3/1964 | Appledorn | 353/98 |
| 3,255,665 | 6/1966 | Weiher et al | 350/276 R X |
| 3,393,034 | 7/1968 | Imai | 350/276 R X |
| 3,438,699 | 4/1969 | Secger | 350/276 R |
| 2,976,759 | 3/1961 | Bleuer | 350/276 R |

Primary Examiner—David Schonberger
Assistant Examiner—Toby H. Kusmer
Attorney—Kinney, Alexander, Sell, Steldt & Delahunt

[57] ABSTRACT

A glare control shield having particular utility in an overhead projector, consists of fully transparent matching grooved plates which are disposed between stage and Fresnel condensing lens of the projector and with the grooves generally directed toward the position of the operator. Other applications are described.

6 Claims, 4 Drawing Figures

PATENTED JAN 23 1973

3,712,713

SHEET 1 OF 2

INVENTOR.
ROGER H. APPELDORN
BY Kinney, Alexander,
Sell, Steldt & DeLaHunt
ATTORNEYS

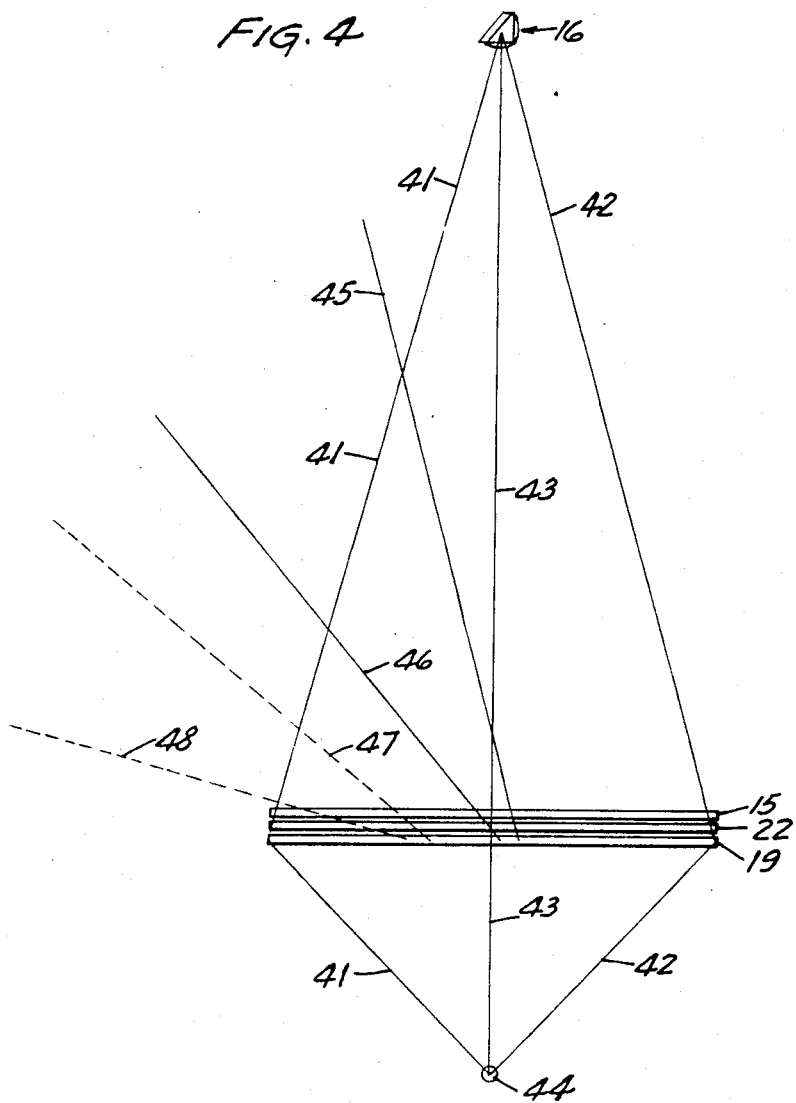

OPTICAL SHIELD OF TRANSPARANT INTERMESHED GROOVED PANELS USEFUL ON OVERHEAD PROJECTS

This application is a continuation-in-part of copending application Ser. No. 712,262 filed Mar. 11, 1968 and now abandoned.

This invention relates to optical shielding devices useful in the elimination of extraneous rays of light. In one important aspect it relates to an improvement in overhead projectors and to the means for accomplishing the same. There is provided a fully transparent optical shield member composed of two intermeshing, identically ridged and grooved, fully transparent panels.

A form of overhead projector which has enjoyed widespread acceptance for classroom use, for example as described in U.S. Pat. No. 3,126,786, comprises, in order, a source of intense illumination, a condensing lens which is preferably in the form of a Fresnel lens, a flat stage, and a focusing projection head. Means for minimizing heating effects may be included if desired. In use, a projection transparency is laid on the stage and the image is focused on a screen. The operator stands at the side or a rear corner of the projector and facing the audience, and while speaking may point to significant portions of the transparency, or mark the same as desired, the pointer and marks being visible on the screen to the watching audience. During this procedure, the transparency is fully accessible to the operator. However the intensity of extraneous light from the projector is so great as to interfere severely with the ability of the operator to view both the transparency and the audience. Either he is temporarily blinded by the glare so that he cannot see the audience, or he may employ dark glasses to protect his eyes and then must remove the glasses to view the audience, or he finds it necessary to reduce the intensity of light from the source and thereby makes the projected image less easily visible to the audience.

The effect of extraneous light, obtained by internal reflection at the condensing lens, is generally disturbing to the operator, and is particularly distressing in the case of projectors employing a flat Fresnel condensing lens. The structure of such lenses inherently results in a concentration of light visible along that diameter of the lens which extends toward, or is in line with, the operator, and which has been aptly described as the "propeller effect" because of the propeller-like shape of the visible area of high light intensity and the movement of the beam as the viewer circles the projector.

In U.S. Pat. No. 3,511,563 there is described and claimed an overhead projector having a glare-reducing shield wherein shielding is accomplished by the incorporation of thin opaque louvers which are substantially parallel to the projection light rays. The louvers are disposed along the glare path, i.e. across that diameter of the Fresnel lens which extends toward the operator, and are so arranged as to prevent or greatly reduce glare at the operator's position. The transparency remains fully visible to the operator, and the intensity of the projected image remains at a high level. Thus the operator is enabled to glance momentarily at the transparency for purposes of marking or pointing to the same, and then immediately return his glance to the audience, without any temporary blindness or any visual discomfort, while the projected image remains clearly visible to the audience.

Another form of light control panel, together with other applications therefor, is described in U.S. Pat. No. 3,255,665. The panel is in the form of two intermeshing ridged and grooved transparent panels. A somewhat similar structure is described in U.S. Pat. No. 3,393,034. In both cases one of the internal surfaces is rendered opaque, so that a considerable fraction of a beam of incident light normal to the surface of the panel is eliminated from the emitted beam.

Another similar form of light control panel, shown in U.S. Pat. No. 3,438,699, employs two intermeshing identically ridged and grooved panels each of which is fully transparent. However the structure by internal reflection prevents the passage of light rays incident within some few degrees of normal. Since in a typical overhead projector almost the entire projected beam falls within the indicated angles, the panel would obviously be worthless as a glare control shield for use therein.

Figure 3:
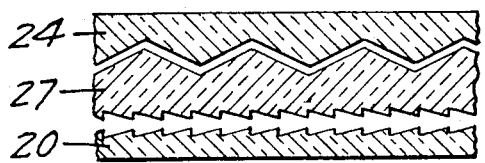
Figure 2:
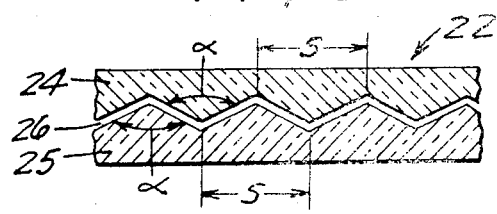

It has now been found possible substantially to eliminate harmful glare from an overhead projector without any significant loss in light intensity at the viewing screen, by employing as a glare control shield a pair of fully transparent intermeshing identically ridged and grooved panels as will now be more fully described in connection with the appended illustrative drawing, in which:

FIG. 1 is a view, in perspective and partly cut away to show detail, of a popular commercial form of overhead projector modified in accordance with the principles of the present invention, FIG. 2 is a partial vertical cross-section of the glare control shield employed therein, FIG. 3 is a similar view of a combined glare control shield and Fresnel condensing lens, and FIG. 4 is a diagrammatic representation of the path of selected light rays seen from the front of the projector.

The projector 10 of FIG. 1 comprises a case 11 containing a lamp and reflector assembly accessible through a door 12 in the front wall of the case and connected through a switch 13 with a cord and plug assembly 14 for connection to a source of electric power. The case also contains fan means for cooling purposes. A bevel-edged stage 15 supported in a frame 23 forms a top for the case and a support for projection transparencies. A projection head 16 is supported above the center of the stage on a support 17 and is vertically adjustable for focusing of the projected image by means of knob 18 and associated gearing.

Beneath the stage 15 there is mounted a compound Fresnel condensing lens 19. A glare-control shield 22 is disposed within the frame 23 between the stage and the lens. The several components are assembled and held in place within the frame in known manner, i.e. by means of appropriate ledges, spacers, and retaining lugs.

Placing the shield very close to the position of the transparency of which a projection is desired is fully effective in controlling glare but has the undesired effect of focusing on the screen the glare-controlling pattern. It is therefore preferable to place the shield somewhat below the surface of the stage. A preferred structure includes the glare control structure with the Fresnel condensing lens structure in a single assembly, thereby reducing the number of optical surfaces required and correspondingly increasing the proportion of the light reaching the projection screen.

The glare-control shield 22 is shown on a larger scale in FIG. 2 to consist of mating or intermeshing identically ridged and grooved panels 24 and 25 separated by a narrow space 26. For best results the ridges and grooves are parallel to a line extending from the center of the stage to the position occupied by the operator, and which ordinarily is near the front corner R as indicated in FIG. 1 and at a distance just sufficient to permit easy hand contact with the stage while keeping the shoulder out of the projected beam. Adequate control of glare may ordinarily be obtained with the ridges and grooves extending longitudinally from side to side of the stage area; and this orientation is usually preferable since it is equally effective for both right-handed and left-handed operators. Variable orientation of the shield may be achieved by simply removing the same and replacing it in a different orientation; or the shield may be given a circular outline, rotatably supported in a suitable circular frame within the frame 23, and oriented by partial rotation using a protruding handle member, to place the ridges and grooves in the most appropriate position for any particular position of the operator.

Good results have been achieved with a glare control shield as described in connection with FIG. 2 mounted midway between the stage 15 and the lens 19 and with the longitudinal dimension of the ridges and grooves parallel with the front edge of the frame, i.e. with each ridge and groove extending from side to side of the shield. The ridges and grooves are formed at an angle, $\alpha$, of 110° and at a recurring spacing, $s$, of 20 mils (0.02 inch). Each panel desirably has a thickness of about 60 mils to insure adequate structural strength and rigidity. The two may be formed into a unitary article by sealing around the edges, for convenience in handling and to prevent soiling of the angular surfaces.

The shield is conveniently made from flat sheets of transparent thermoplastic materials, e.g. methyl methacrylate polymer or cellulose acetate butyrate, by pressing with a polished metal mold at elevated temperature. The two ridged surfaces are merely laid together, the normal slight irregularities in the transparent surfaces being sufficient to maintain a degree of separation adequate for optical purposes.

The angle of the prismatic ridges is such that light rays entering from below and not too far from perpendicular to the plane of the peaks of the ridges pass through the shield, whereas glare rays, or rays of extraneous light approaching at a considerable angle to said plane and generally along said grooves are totally reflected at the prism-air interface and are prevented from emerging as glare. The particular angle employed in forming the ridges, while being generally of the order of 110°, may be different for materials of different refractive index or for different specific purposes. Angles of from about 100° to about 120° have been shown to be effective. The spacing S is limited only by manufacturing considerations, the closest possible spacing being ordinarily preferred. The outer surfaces of the shield are parallel and smooth.

Improved efficiency of illumination is achieved in the structure shown in FIG. 3 by the elimination of two glass-to-air interfaces and the slight loss of transmission normally occasioned thereby. In this structure the lower panel of the glare control shield and the upper panel of the compound Fresnel condensing lens are combined in a single element 27, the upper shield panel 24 and the lower lens element 20 remaining the same as in the structure of FIGS. 1 and 2. Similarly, the upper panel 24 of the shield may serve as the stage 15, although with some loss of clarity in the projected image as previously noted.

FIG. 4 illustrates the effect of the shield 22, constructed as described in connection with FIG. 2, in permitting passage of all useful rays while eliminating harmful glare-producing rays directed to either side of the projector. The bundle of primary rays indicated by the limiting and normal rays 41, 42, 43 from source 44, are refracted in the Fresnel lens 19 and directed toward the projection head 16. In a typical projector as here described, the outer rays 41, 42 are at an angle of about 15°–17 to the normal, as indicated in the drawing. Secondary rays 45, 46, 47, 48 originate mainly by reflection at the lens 19. Rays such as indicated by full lines 45, 46, and which are at an angle with the axial ray 43 of not more than about 40 degrees, are not affected. Rays which would normally be emitted at angles of less than about 40° and generally along the direction of the ridges and grooves, such as indicated by dotted lines 47, 48, are stopped by internal reflection at the shield. These include the harmful glare rays.

Where the angle $\alpha$ between adjacent faces is made less than about 110°, the limiting angle to the normal at which the extraneous rays are prevented from passing the shield is increased, until at interfacial angles less than about 100° much or all of the primary beam is prevented from reaching the projection head. With greater interfacial angles the limiting angle conversely is increased, and at interfacial angles greater than about 120° the glare control area is so small as to be of no practical value in the operation of the overhead projector.

For convenience in manufacture it is usually desirable that all of the intermeshing ridges and grooves of the two panels are constructed at the same uniform interfacial angle. Thus in the shield of FIG. 2, and as used in conjunction with FIG. 4, each ridge face forms an angle of 35° with the outer flat face of the panel. In some instances it may be found desirable to slant the ridges and grooves to one side; and such structure is also contemplated as coming within the ambit of the invention. As an example, an incident axial ray after refraction at the entering surface, may be at an angle of 10° to the normal; the two faces of each groove will then be at angles of 25° and 45° respectively with the surface of the panel, so that the axial ray will again bisect the included angle.

Glare shields as here described and illustrated, while having particular utility in connection with overhead projectors, are also highly useful in other light control areas, e.g. windows, vehicle headlights, beacons etc. Again, the useful light rays incident to the shield at angles near the normal are fully transmitted whereas the undesirable glare rays, incident at considerably greater angles to the normal and generally along the axis of the grooves and ridges, are internally reflected and prevented from being transmitted through the shield. As a specific example, a windowpane formed as described in connection with the shield of FIG. 2 and having an interfacial angle of about 100°, with the grooves and ridges disposed vertically, provides a clear view at most viewing angles but effectively prevents entry of direct sunlight with the sun facing the window at an angle greater than about 50° above the horizon.

What is claimed is as follows:

1. An optical shield having parallel smooth outer surfaces and consisting essentially of two fully transparent intermeshing identically longitudinally ridged and grooved panels wherein the adjacent faces of the ridges or grooves are disposed at an included angle of at least about 100° and not greater than about 120° wherein said faces are all disposed at substantially the same angle with respect to the smooth outer surfaces.

2. The shield of claim 1 wherein said faces are disposed at an included angle of about 110°.

3. The shield of claim 2 wherein said ridges and grooves are at a uniform constant spacing of not greater than about 2 mils.

4. The shield of claim 2 wherein said panels are constructed of methyl methacrylate polymer.

5. An overhead projector including a light source, a stage for supporting a transparency containing projection images, a projection head, and a condensing lens for directing light from said source through said stage to said projection head for projection of said images onto a viewing screen, and characterized by the inclusion, in a position between said lens and said stage, of an optical shield consisting essentially of two fully transparent intermeshing longitudinally ridged and grooved panels wherein the adjacent faces of the ridges or grooves are disposed at an included angle of about 110° and with the ridges and grooves directed toward the sides of said projector.

6. The overhead projector of claim 5 wherein said condensing lens is included as a component of said shield.

* * * * *